March 3, 1931.  J. W. LEGG  1,794,910
OSCILLOGRAPH SYSTEM
Filed Nov. 9, 1928  2 Sheets-Sheet 1
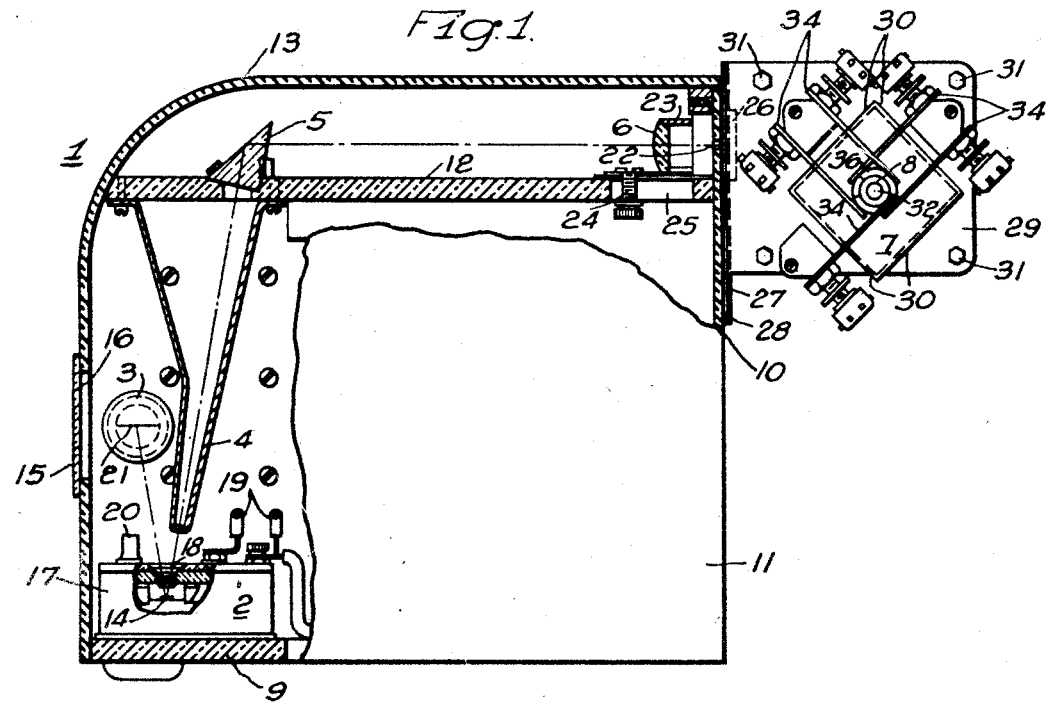
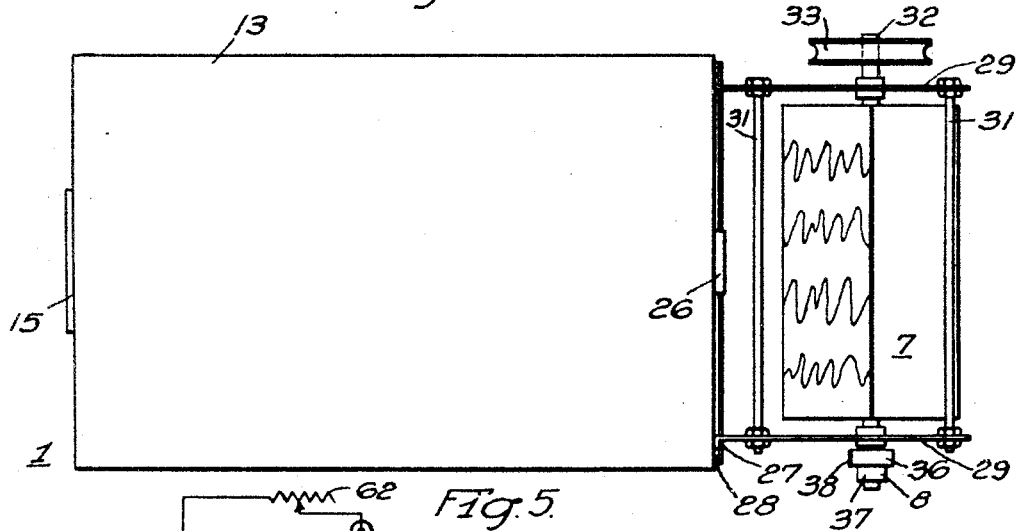
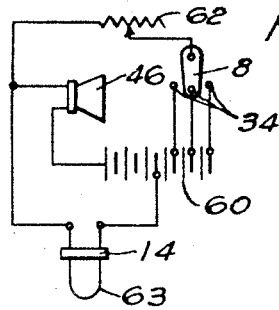
INVENTOR
Joseph W. Legg.
BY
Wesley G. Carr
ATTORNEY March 3, 1931.  J. W. LEGG  1,794,910
OSCILLOGRAPH SYSTEM
Filed Nov. 9, 1928   2 Sheets-Sheet 2

INVENTOR
Joseph W. Legg.
BY
Wesley G. Carr
ATTORNEY

Patented Mar. 3, 1931

1,794,910

UNITED STATES PATENT OFFICE

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA

OSCILLOGRAPH SYSTEM

Application filed November 9, 1928. Serial No. 318,293.

My invention relates to oscillographs or oscilloscopes and particularly to those of the portable type in which the characteristic of an electrical quantity may be observed by viewing an effect produced by the vibrations of the deflecting system of the instrument as a quantity is impressed upon it.

An object of my invention is to provide a device of the above-mentioned character which shall employ a single galvanometer element and means whereby the same may give apparently simultaneously indications of conditions in different circuits by means of waves appearing in side-by-side relation.

A further object of my invention is to provide a device of the above-mentioned character which shall employ a single galvanometer element and means whereby the same may give indications of conditions in a single circuit by means of waves appearing in side-by-side relation.

A further object of my invention is to provide means for viewing voice or other high-frequency waves with the detail necessary for recognizing their source.

A further object of my invention is to provide means for recognizing speech or other sound waves by the sense of sight rather than by the sense of hearing.

A further object of my invention is to provide visual means for comparing the speech of different persons.

A further object of my invention is to provide a piece of apparatus which shall be compact and readily portable.

It has been well known that oscillographs may be used to study the characteristics of voice waves, but, heretofore, it has been impossible to observe voice waves in a viewing means with sufficient detail to recognize the sound producing the wave. Furthermore, with the oscillograph apparatus formerly available, it was impossible to view a plurality of waves simultaneously while employing only one galvanometer deflecting element.

In practicing my invention, I employ a galvanometer deflecting element carrying a mirror, a lamp for throwing a beam of light upon the galvanometer mirror, an optical system for directing the beam deflected from the galvanometer mirror against a ground-glass screen, a polygon of viewing mirrors for viewing the spot of light which appears on the screen when the beam strikes it, and a commutator or switching mechanism for tilting the galvanometer element into different planes as the mirrors rotate.

The galvanometer deflecting element is tilted and held momentarily in a predetermined plane by passing direct current through it and either changing the value or the direction of this current. Since the circuit is so arranged that both the direct current and the alternating current to be studied pass through the galvanometer at the same time, it is evident that, each time the direct current is varied, the alternating-current wave, as it appears in the viewing mirrors, will be shifted to one side of its former position. If this shifting is done rapidly enough, there will appear to be a plurality of waves side-by-side because of the persistency of human vision.

Other features and advantages of my invention will appear from the following description, taken in connection with the accompanying drawing, in which:

Figure 1 is a view, partly in side elevation and partly in section, of an oscillograph embodying my invention.

Fig. 2 is a plan view of the oscillograph, the brushes being removed.

Fig. 5 is a simplified circuit diagram of the electrical connections of the circuit shown in Fig. 3 resulting when the switch is in the downward position.

Figure 3:
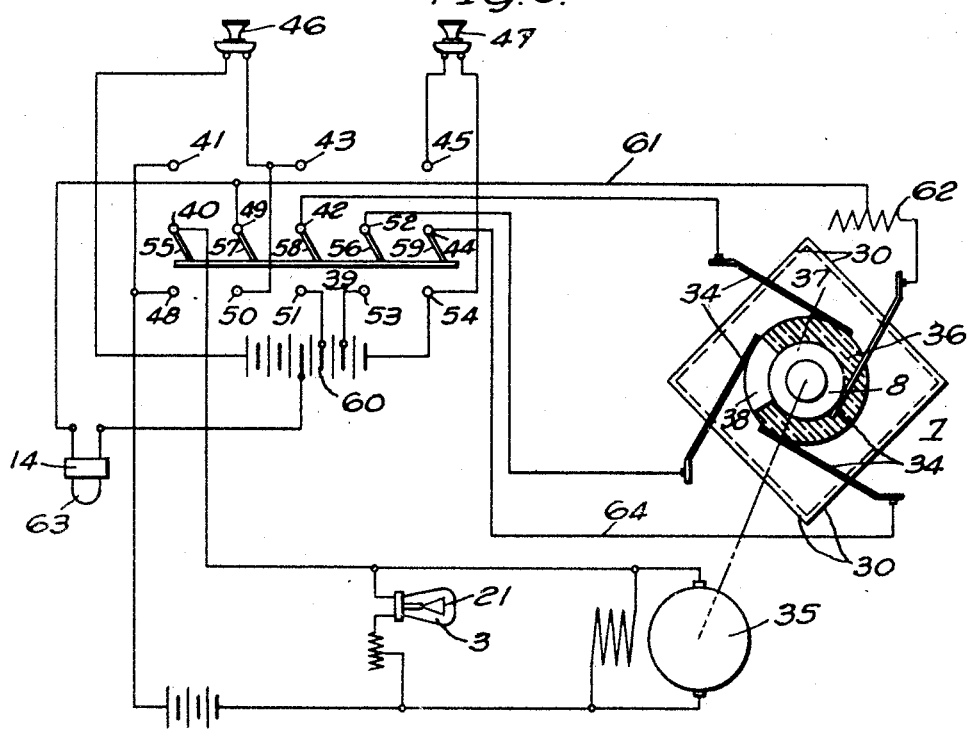
Fig. 3 is a circuit diagram of the electrical connections employed in one embodiment of my invention.

Referring to Fig. 1, the oscillograph comprises a casing 1, a galvanometer 2, a lamp 3, a light shield 4, a prism 5, a lens 6, a polygon of viewing mirrors 7 and a commutator cylinder 8 having cooperating brushes 34.

The casing is preferably constructed of a sheet-insulating material, such as fibrous material impregnated with a binder, and comprises a base plate 9, an end plate 10, side panels 11, a horizontal partition plate 12 and a single integral sheet 13 constituting the top and rear wall of the casing.

The top and rear-wall portions of the casing 1 are joined by a portion of gradual curvature for facility of manufacture and are integral to make the casing 1 light-tight and so prevent the reflection of stray beams of light from the galvanometer mirror 14. A removable cover member 15 is mounted over the opening 16 which permits an inspection of lamp 3.

The galvanometer 2, the detail construction of which is described in Patent No. 1,728,535, issued to me Sept. 17, 1929, comprises a fluid-tight casing 17, disposed in the lower rear portion of the casing 1 containing a horizontally disposed galvanometer mirror 14 disposed beneath the lens or window 18 in the upper wall portion of the galvanometer casing 17. Terminals 19 are provided for the galvanometer winding, and a structure 20 is provided for the purpose of admitting a fluid to the galvanometer casing 17 and for adjusting the tension on the galvanometer deflecting element, as set forth in the co-pending application.

The lamp 3 is adjustably mounted on one of the side panels 11 and comprises an elongated filament 21 constituting a linear light source for the galvanometer 2. The light shield 4, preferably constructed of relatively thin sheet aluminum, is of substantially funnel shape and rectangular in horizontal section. The shield is secured, at its larger end, to the horizontal partition 12 surrounding an opening in the latter. The shield 4 affords a passage enclosing a portion of the light beam reflected from the mirror 14, as indicated by the broken line, and projects downwardly from the partition so that the lower end thereof is just above the galvanometer 2 and beneath the lamp 3. This construction prevents the entry of stray light beams from the lamp 3 to the passage defined by the shield 4.

The prism 5, secured in position on the partition over the opening, directs the beam from the mirror 14 through a semi-cylindrical lens 6 toward a slot 22 in the end plate 10.

The lens 6 is clamped to a member 23 that is adjustably mounted on the partition 12 by means of a screw 24 which extends through a slot 25 in the partition 12. This construction permits the beam to be properly focused, through the slot 22, upon a ground-glass screen 26 so that it may be viewed by looking down upon the polygon of mirrors 7.

Referring to Figs. 1 and 2, a member 27, of substantially U-shape and preferably constructed of sheet or strap material, is held in slightly-spaced parallel-plane relation to the outer surface of the end plate 10 by a spacer 28. The arrangement of parts permits the flanged plates 29, supporting the polygon of mirrors 7, to be slipped into position behind the member 27 to hold the mirrors 30 in proper relation to the slot 22. The flanged plates 29 are held parallel to each other by means of the bolts 31 to form a rigid structure for supporting the viewing apparatus.

The polygon-of-mirrors device 7 comprises four mirrors 30 mounted on a shaft 32 which is journalled in the flanged plates 29 and carries a pulley 33 on one end thereof and a commutator cylinder 8 on the other end. Brushes 34 are mounted on one of the flanged plates 29 so disposed that they cooperate with the commutator cylinder 8.

The polygon of mirrors 7 is rotated at a high rate of speed by a belt connecting the pulley 33 to a motor 35 (Fig. 3).

The commutator cylinder 8 comprises an insulating segment 36 and two conducting segments 37 and 38 which are electrically connected. Instead of the usual brushes containing graphite for lubricating the commutator cylinder, brushes of light flexible material, such as phosphor bronze, are used. The necessary lubrication is obtained by making the commutator cylinder itself of materials containing a lubricating substance, preferably graphite. The insulating segment 36 is made of some insulating material, such as bakelite, containing a small amount of graphite. The conducting segments 37 and 38 may be made of material commonly used for brushes which comprises a conducting material, such as copper, containing a small amount of graphite.

It was found necessary to resort to this commutator structure because the galvanometer 2 is so sensitive that slight changes in contact resistance at the commutator cause an appreciable error in the galvanometer deflection. At the high commutator speeds required, when the usual graphite or copper-graphite brushes were employed, sufficient pressure could not be applied to the brush to avoid this varying contact resistance without increasing the friction so much than an undesirably large motor was required to rotate the viewing mirrors 30 and comutator cylinder 8. Since a portable apparatus was desired, the motor necessary for driving the viewing means had to be small. When the lubricating material was put into the commutator cylinder 8, it became possible to use light-weight brushes 34 which would make steady contact while under a light pressure.

Referring to Fig. 3, a circuit arrangement is shown which enables one to use the oscillograph apparatus in two different ways by throwing the switch 39 either up or down. The switch 39 has five switch blades mechanically connected together by a bar of insulating material. With the double-throw switch 39 thrown in the upward position, to connect contacts 40 and 41, contacts 42 and 43 and contacts 44 and 45, the circuit is in condition to make the outputs of the two microphones 46 and 47 appear in the polygon of mirrors 7 as two waves side-by-side with a zero line between them. When microphones 46 and 47 are spoken into at the same time, the voice wave from each microphone appears in the polygon of mirrors 7, and the speech waves from the two microphones may be compared.

With the switch thrown in the downward position to connect contacts 40 and 48, contacts 49 and 50, contacts 42 and 51, contacts 52 and 53, and contacts 44 and 54, the circuit is in condition to make the output of microphone 46 appear in the polygon of mirrors 7 as a plurality of side-by-side waves. This enables one to see the voice waves especially those portions representing consonants, in greater detail than would otherwise be possible.

With the switch thrown in the upward position for duo-microphone operation, the end switch blade 55 connects contacts 40 and 41 and lights the oscillograph lamp 3 and starts the motor 35 which drives the polygon of mirrors 7 and commutator cylinder 8. The second switch blade from the right 56 and the second switch from the left 57 are not used. Switch blade 58 connects microphone 46 to upper brush 34, and switch blade 59 connects microphone 47 to lower brush 34 so that first one and then the other end of the battery 60 is connected through one of the microphones to the upper conductor 61, as the commutator cylinder 8 rotates.

The upper conductor 61 is connected, through a resistance 62, to the right-hand brush 34 which is alternately connected to the two brushes above-mentioned, as the viewing mirrors 30 and the commutator cylinder 8 are rotated. As a result, when the viewing mirrors 30 have been rotated to the point where the conducting segment 38 makes contact with the upper brush 34, a circuit is completed from the midpoint of the battery 60 through the galvanometer deflecting element 63, through the upper conductor 61, the resistance 62, the common or right hand brush 34, the conducting segments 37 and 38, the upper brush 34, from contact 42 to 43, through the left-hand microphone 46 and back to the positive terminal of the battery 60. It will be noted that the conducting segment 38 of the commutator makes contact with a brush 34 just as two of the mirrors 30 reach a vertical position. As a result, an observer can see a wave of the current in the circuit just completed by looking down upon the left-hand mirror while it is rotating from its vertical to its horizontal position.

As the mirrors 30 continue to rotate, the conducting segment 38 makes contact with the lower brush 34, and a circuit is complete from the midpoint of the battery 60 through the galvanometer element 63, through the upper conductor 61, the resistance 62, the common brush 34, the conducting segments 37 and 38, the lower brush 34, the contacts 44 and 45 and the right-hand microphone 47, to the negative terminal of the battery 60.

It is evident that, when the left-hand microphone 46 is connected to the galvanometer element 63 through the upper brush 34, the current flows through the element 63 in a direction opposite to that in which it flows through the same element when the right-hand microphone 47 is connected to it through the lower brush 34. As a result, the steady direct current supplied by the battery 60 tilts the galvanometer element first to one side of its normal position and then to the other, as the viewing mirrors 30 are rotated.

If both microphones are in operation during this time, and the mirrors are being rotated rapidly enough, the persistency of vision will cause the microphone outputs to appear in the polygon of mirrors 7 as two side-by-side waves (with a zero line between them). A deaf person may make use of this arrangement to learn basic sounds by speaking into one microphone while an instructor speaks into the other and, at the same time, comparing the two waves which appear in the viewing means.

It should be noted that the outputs of the microphones 46 and 47 could be studied in the same manner by varying the strength of the direct current flowing through the galvanometer element 63 rather than by reversing its direction.

While only two of the mirrors 30 in the duo-microphone arrangement are utilized for flashing waves before the eyes of the observer, the other two mirrors perform the important function of flashing light (in the form of zero lines) into the eyes of the observer between the flashes of the waves. Because of the high frequency of the light flashes thus obtained, eye strain is much less than it would be otherwise.

When the switch 39 is thrown to the downward position for four-wave visualization of the output from a single source, the left-hand switch blade 55 closes the end contacts 40 and 48 so as to light the oscillograph lamp 3 and start the motor 35 for driving the viewing mirrors 30 as before. The left-hand microphone 46 is connected, by means of the second switch blade, from the left 57 in series with the galvanometer element 63 and this series circuit is connected across the left-hand portion of the battery 60. When the second switch blade from the left 57 is closed, a point intermediate the microphone 46 and the galvanometer element 63 is connected to the upper conductor 61 and, through the resistance 62, to the common brush 34. A circuit is completed, through the upper conductor 61, the resistance 62, the common brush 34, the conducting segments 37 and 38, one of the other brushes 34 to a right-hand portion of the battery 60, through this portion of the battery 60, through the galvanometer element 63, and back to the point intermediate the microphone 46 and the galvanometer element 63.

It will be noted that, with the switch 39 in the downward position, the right-hand microphone 47 is disconnected from the circuit. The circuit from the common brush 34, through the conducting segments 37 and 38, to the right-hand portion of the battery 60 is completed through one of the three switch blades 58, 56, and 59, depending upon the position of the commutator cylinder 8.

For best operation of the four-wave visualization circuit, the resistance of the rheostat 62, as well as that of the microphone 46, should be greater than the resistance of the galvanometer element 63. The following resistance values for microphone 46, rheostat 62, and element 63 have been found to give satisfactory results; microphone 60 ohms, rheostat 10 ohms, galvanometer element 1 ohm.

The operation of the four-wave visualization circuit will be more fully understood from an inspection of Fig. 5 which shows the circuit in its simplest form. When using the resistance values given above, it will be noted that, while one-tenth of the microphone current passes through the rheostat 62, the greater part of this current, nine-tenths) passes through the galvanometer element 63. Also, while a small portion (one-sixtieth) of the steady direct current from the right-hand portion of the battery 60 passes through the microphone 46, the greater part of it passes through the galvanometer element 63 to tilt it into different planes as the viewing mirrors 30 rotate.

In operation, when the conducting segment 38 rotates into contact with the lower brush 34, maximum voltage from battery 60 is impressed across the deflecting element 63 to tilt it into a plane removed from its normal position and hold it there momentarily. The circuit which impresses this voltage across the galvanometer element 63 may be traced from the right-hand terminal of the galvanometer element 63, through the right-hand portion of the battery 60, through the right-hand switch blade 59, through the conductor 64, the lower brush 34, the conducting segments 37 and 38, the right-hand brush 34, the rheostat 62 and the upper conductor 61, to the left-hand terminal of the galvanometer element 63.

As the commutator cylinder 8 rotates in a clockwise direction, the left-hand brush and the upper brush are successively connected to switch blades 56 and 58, respectively, to impress decreasing amounts of the direct-current voltage across the galvanometer element 63 and thereby tilt it into planes which successively recede from the plane in which the element was positioned by means of the maximum direct-current voltage. When the conducting segment 38 leaves the upper brush, the source of direct current for tilting the galvanometer element 63 is disconnected from the element 63 and it rests in its normal position until the segment 38 again makes contact with the lower brush. It should be noted that the normal position of galvanometer element 63 mentioned above is a position at one side of the mechanical zero of the element because of the direct-current component of the microphone passing through it.

In this circuit arrangement, the galvanometer element 63 is tilted by impressing varying values of direct-current voltage upon it rather than by reversing the direction of the direct-current voltage, as in the duo-microphone arrangement.

From an inspection of Fig. 5, it is evident that, in the four-wave visualization circuit described above, the direct-current component of the microphone circuit passes through the deflecting element 63 in opposition to the direct current which passes therethrough for tilting it. If the direct-current tilting component has a maximum value of approximately twice that of the direct-current component of the microphone, as is usually the case in practice, the current in the deflecting element is actually reversed for the two right-hand waves from what it is for the two left-hand waves. By using this arrangement, both the zero shift of the deflecting element from its mechanical zero and the heating of the galvanometer are made a minimum.

If the microphone 46 is spoken into while the viewing mirrors 30 are being rotated at the proper speed, four waves will appear to be present simultaneously in the viewing means 7, as indicated in Fig. 2. Unless it is desired to teach pitch, the mirror speed may be anything within a considerable range when using the duo-microphone or quadruple-wave arrangement. Actually, each one of the waves is shown by a different mirror but, since the mirrors 30 are flashed past the eyes of the observer at a rate greater than the persistency of vision, the waves appear to be side by side in one mirror, as shown.

The object in viewing the waves from a single source in this manner is to enable one to see high-frequency waves of both constant and varying frequency in greater detail than is otherwise possible. If the galvanometer element 63 were not tilted into different planes in rapid succession, while passing the voice current through it, as described above, the viewing mirrors 30 would have to be rotated so slowly that the cycles of the voice currents would be crowded together too much and, furthermore, there would be a flicker that would cause eye strain. If an attempt were made to overcome this difficulty by rotating the mirrors 30 at a higher speed, the mirrors would flash by the eye of the observer at a rate greater than the persistency of human vision, and one wave would be so superposed upon another as to confuse both waves. By making the output of the microphone 46 appear as four side-by-side waves, in the manner described above, the viewing mirrors 30 may be rotated four times as fast as would be permissible otherwise, and it then becomes possible to see even the explosive part of a consonant sound in one of the four adjacent waves.

The motor 35 for driving the polygon of mirrors may be either a synchronous motor or one which may have its speed adjusted, but the latter type of motor is preferred.

When a current of constant frequency, such as that generated by a sustained vowel sound, actuates the galvanometer element 63, the speed of the viewing mirrors 30 may be adjusted until the wave appears to stand still. This phenomenon may be brought about when viewing either two or four waves side-by-side or when viewing one wave only, since it appears whenever the number of cycles per second is a multiple of the number of mirror flashes per second. It is especially useful in teaching a deaf person to speak, with his voice properly pitched, in which application of the device it is preferred to view but one wave. When the mirror speed or the pitch of the voice is varied slightly from the value which makes a wave stand still, the wave appears to float by in one direction or the other, depending upon whether the mirrors have been speeded up or slowed down or the pitch of the voice raised or lowered.

It should be noted that, when the apparatus is connected to show but one wave in the viewing means (as when the rheostat 62 is turned off to disconnect the right-hand brush 34 from the upper conductor 61) and the polygon of mirrors 7 is being rotated at such speed that a current of constant frequency appears as a wave standing still, the persistency of vision will cause a current of varying frequency to appear as several waves (one from each mirror flash) superimposed and jumbled. When viewing the wave generated by either a constant-frequency source, such as a vowel sound, or by a varying-frequency source, such as a consonant sound, it is necessary to make use of four-wave visualization unless the mirrors are rotated in, or nearly in, synchronism with the source being studied. Since it is impossible to rotate the mirrors in synchronism with a varying frequency, the four-wave visualization method is the only one available for studying consonant sounds.

The most satisfactory method of viewing low-frequency waves (60 cycle waves for example) is to make them appear to float in the one or the other direction by running the mirrors 30 slightly out of synchronism with the low-frequency source being impressed upon galvanometer element 63. Satisfactory results may be obtained by running the mirrors one percent out of synchronism, this percentage being greater than is permissible when studying waves in the voice-frequency range. The mirrors may be run out of synchronism the proper amount by gearing them to a synchronous motor connected to the source of current being studied. The gear ratio may be made such that the mirrors will rotate at that percentage of the motor speed which will make the waves appear to float by.

Figure 4:
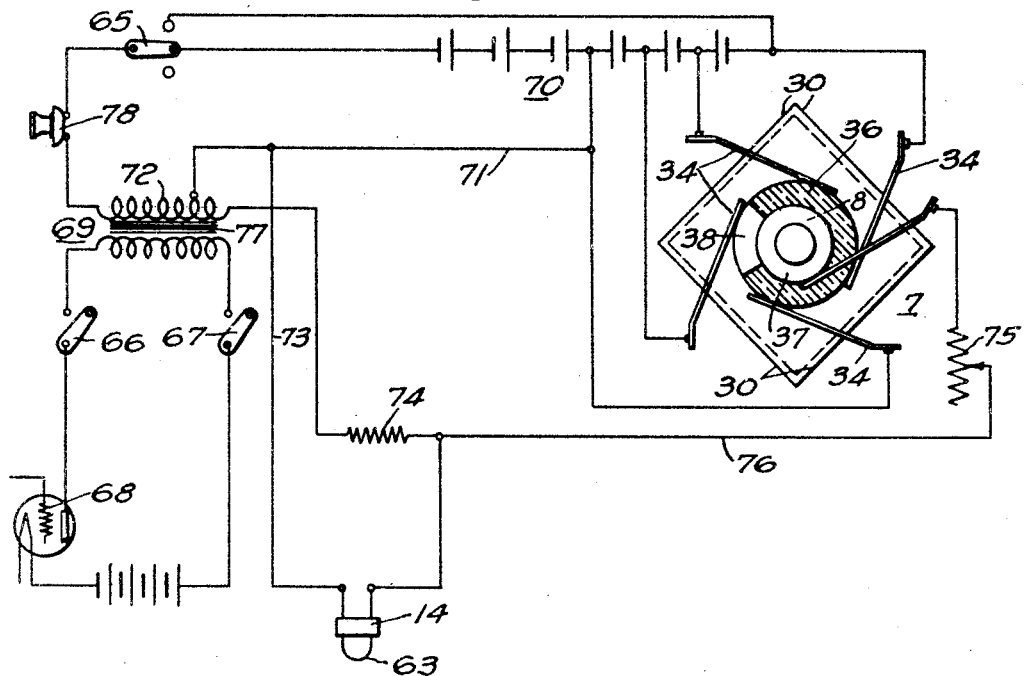
Fig. 4 is a circuit diagram of the electrical connections employed in another embodiment of my invention.

In the circuit shown in Fig. 4, the switches 65, 66, and 67 may be so thrown that the output of either the microphone 78 or the vacuum tube 68 may be studied. The output from either of these sources is viewed as four waves side-by-side, the same as when using the circuit of Fig. 3 with the switch 39 thrown in the down position. The main difference between the circuit shown in Fig. 4 and that shown in Fig. 3, with the switch 39 in the down position, is that, in the circuit of Fig. 4, a step-down transformer 69 connects the source of the waves to the galvanometer element 63 so that it will be operated more efficiently than it would be with the direct connection used in the circuit of Fig. 3.

With the switches in the positions shown in Fig. 4, the microphone 78 is connected to the galvanometer element 63 through an auto transformer. The primary circuit of the auto transformer includes the microphone 78, the switch 65, the left-hand portion of the battery 70, the conductor 71 and the left-hand portion of the transformer winding 72. The secondary circuit includes the galvanometer element 63, the conductor 73, the right-hand portion of the transformer winding 72, and the resistance 74. The right-hand portion of the battery 70 is shunted across the galvanometer element 63 by a circuit including the conductor 71, the right-hand portion of the battery 70, one of the brushes 34, conducting segments 38 and 37, the common brush 34, the resistance 75 and the conductor 76.

The operation of this circuit is substantially the same as that of the four-wave visualization circuit shown in Fig. 3. As the viewing mirrors 30 are rotated, a different value of direct current is sent through the galvanometer element 63 each time the conducting segment 38 of the commutator cylinder 8 contacts with one of the brushes 34. As a result, the galvanometer element 63 is rapidly tilted into different planes and held in each plane momentarily at the same time that the voice currents are being impressed upon it from the primary circuit of the transformer 69.

Both the rheostat 75 and the resistance 74 should have a resistance value somewhat greater than the resistance of the galvanometer element 63. The resistance 74 is used in order that the greater part of the direct current from the source for tilting the galvanometed element 63 shall pass through the element rather than through the right-hand portion of the transformer winding 69.

The resistance 74 serves another function in that it gives a more constant value to each pulse of direct current which is supplied to the galvanometer element 63 while the conducting segment 38 is making contact with one brush. If the resistance 74 were omitted, each time the conducting segment 38 made contact with a brush, the right-hand portion of the transformer winding 72 would present a high impedance to the flow of current so that practically all of the direct current would flow through the galvanometer element 63, but this impedance would quickly become much smaller. Consequently, the galvanometer element 63 would gradually move from one plane to another while the segment 38 was making contact with one brush instead of remaining in the one plane as desired. As a result, the waves appearing in the polygon of mirrors 7 would be on a curved axis instead of on a straight one. The following resistance values for rheostat 75, resistance 74, element 63, and right-hand portion of winding 72 have been found to give satisfactory results: Rheostat 10 ohms, resistance 2 ohms, galvanometer element 1 ohm, right-hand portion of transformer winding .1 ohm.

It will be noted that the lower brush 34 is not necessary for satisfactory operation of the circuit but it is included in order that the voice currents shall be shunted around the galvanometer element 63 by substantially the same amount when direct current is not being passed through the element 63 as when it is being passed through.

The portion of the battery 70 comprising the three left-hand cells is preferably connected with its polarity in opposition to that of the right-hand portion of the battery in order to avoid saturation of the transformer core 77. With this arrangement, the ampere turns due to the direct-current component of the microphone circuit are opposed to those due to the direct current which tilts the galvanometer element 63, and the tendency of the core 77 to become saturated is much less than it would be otherwise.

If desired, the switch 65 may be thrown to its upward position to connect only the three right-hand cells of battery 70 into the circuit. While this does not change the operation of the circuit in any way, it puts the microphone 78 across a battery which may not maintain a voltage as constant as is desired for the microphone supply.

When it is desired to study the output of the vacuum tube 68, the lower switches 66 and 67 are closed and the upper switch 65 is opened. For this arrangement, the operation of the circuit connected to the secondary of transformer 69 is the same as the operation when using the auto transformer.

While the galvanometer element 63 has been shown and described as the deflecting element of the galvanometer, it will be understood that the galvanometer element which carries the current need not be the deflecting element in all instances.

Various modifications may be made in my invention without departing from the spirit and scope thereof, and I desire, therefore, that only such limitations shall be placed thereon as are shown by the prior art and set forth in the appended claims.

I claim as my invention:

1. Apparatus comprising a galvanometer element, a source of a varying electrical quantity having a terminal connected to one terminal of said element, a switch having a common conducting element which makes successive contact with different conductors, an electrical connection including a resistance element between the other terminal of said galvanometer element and said common conducting element, and means for connecting the other terminal of said source of a varying electrical quantity to either said other terminal of said galvanometer element or to one of said different conductors.

2. Apparatus comprising a galvanometer element, a source of a varying electrical quantity having a terminal connected to one terminal of said element, a switch having a common conducting element which makes successive contact with different conductors, an electrical connection including a resistance element between the other terminal of said galvanometer element and said common conducting element, a source of direct current and means for varying said direct current in accordance with a quantity to be studied, one terminal of said source of direct current being connected to the first-named terminal of said galvanometer element and means for connecting the other terminal of said source of a varying electrical quantity to either the other terminal of said galvanometer element or to one of said different conductors and for also connecting one of said different conductors to either said direct current source or to said means for varying said direct current.

3. Apparatus comprising means including a galvanometer element for deflecting a beam of light in accordance with a varying electrical quantity, means for varying the deflection of said beam of light, means for connecting said galvanometer element to different sources of varying electrical quantities, and means for passing a direct current of different value through said element each time it is connected to one of said different sources.

4. Apparatus comprising means including a galvanometer element for deflecting a beam of light in accordance with a varying electrical quantity, means for viewing the deflection of said beam of light, means for switching said element from one source of an electrical quantity to another at a rate at least equal to the persistency of human vision, and means for passing a direct current of different value through said element each time it is connected to one of said different sources.

5. In combination with means for passing a beam of light along a predetermined path, means for vibrating said beam of light in accordance with a varying electrical quantity in a circuit, means for switching said second means from one circuit to another and for making the vibrations corresponding to said circuits appear as a plurality of waves side by side.

6. In combination with a single galvanometer element and a viewing means, means for switching said element from one circuit to another at a rate at least equal to the persistency of human vision, and means for making the waves corresponding to said circuits appear in said viewing means as a plurality of waves side by side.

7. Apparatus comprising viewing means, means for making an electrical quantity appear in said viewing means as a wave, means for connecting said second-named means first to one source of an electrical quantity and then to another, and means for making the electrical quantities from said source appear as a plurality of waves side by side.

8. Apparatus comprising a single indicating element, a viewing means, and means for making said element show the characteristics of a plurality of electrical quantities as a plurality of waves side by side in said viewing means.

9. The combination with means for passing a beam of light along a predetermined path, of means for vibrating said beam of light in accordance with a varying electrical quantity, viewing means including a moving mirror in the path of said beam of light, means for making said vibrating beam of light appear in said viewing means as a plurality of waves side by side, said last named means comprising a commutator having an element which rotates in synchronism with the movement of said mirror.

10. The combination with means for passing a beam of light along a predetermined path, of a deflecting system for vibrating said beam of light in accordance with a varying electrical quantity, viewing means including a rotating mirror in the path of said beam of light, and means including a commutator having an element which rotates in synchronism with said mirror for tilting said deflecting system from one plane to another during the vibration of said beam of light.

11. Apparatus comprising a galvanometer element, a circuit including a source of pulsating current in series with said element, a second circuit including a source of direct current and means for varying the value of said direct current, said second circuit being connected in parallel with said galvanometer element.

12. A circuit comprising a galvanometer element, a circuit including a source of pulsating current in series with said element, a second circuit including a source of direct current and means for varying the value of said direct current, said second circuit being connected in parallel with said element, both of said circuits having a resistance greater than the resistance of said element.

13. A circuit comprising a galvanometer element, a source of pulsating current in series with said element, a source of direct current and a resistance element connected in series therewith and the two connected in parallel with said element and said source of pulsating current, the resistance of the pulsating current source and of the resistance element each being greater than the resistance of said galvanometer element.

14. The method of operating apparatus including a source of a varying electrical current having a direct-current component, a galvanometer element, and a source of constant direct current which comprises passing said direct-current component through said galvanometer element in one direction and simultaneously passing said constant direct current through said galvanometer element in a direction opposed to said first direction.

15. In electrical apparatus, means including a galvanometer element for deflecting a beam of light in accordance with a varying electrical quantity, viewing means for observing a deflection of said beam of light, said element being connected through a transformer to the source of said electrical quantity, a resistance in series with said element and the secondary winding of said transformer, and a circuit including a source of direct current and means for varying the value of said direct current in series therewith, said circuit being connected in parallel with said element.

16. In electrical apparatus, means including a galvanometer element for deflecting a beam of light in accordance with a varying electrical quantity, viewing means for observing a deflection of said beam of light, said element being connected through an auto transformer to the source of said electrical quantity, a resistance in series with said element and the secondary winding of said transformer, and a circuit including a source of direct current and means for varying the value of said direct current in series therewith, said circuit being connected in parallel with said element.

17. In electrical apparatus, means including a galvanometer element for deflecting a beam of light in accordance with a varying electrical quantity, viewing means for observing a deflection of said beam of light, said element being connected through an auto transformer to the source of said electrical quantity, a resistance in series with said element and the secondary winding of said transformer, and a circuit including a source of direct current and means for varying the value of said direct current in series therewith, said circuit being connected in parallel with said element, said first named source being connected in series with the primary of said auto transformer and in series with a source of current which has its polarity opposed to that of first named source of direct current.

18. In combination, a sensitive galvanometer, means for passing varying amounts of direct current through said galvanometer in rapid succession while it is being deflected in accordance with a varying quantity, said means including a source of direct current and a rotary switch connected to said galvanometer, said switch comprising a cylinder made of materials containing a lubricating substance, and light-weight metal brushes for cooperating therewith.

19. In combination, a sensitive galvanometer, means for passing direct current through said galvanometer while it is being deflected in accordance with a varying quantity, and means for varying the value of said direct current at a rate at least equal to the persistency of human vision, said last means comprising a rotary switch consisting of a cylinder made of materials containing a lubricating substance, and light-weight metal brushes in contact with said cylinder.

20. In combination, a sensitive galvanometer, an impedance element in parallel therewith, means for passing direct current through said galvanometer while it is being deflected in accordance with a varying quantity, said means comprising a source of direct current in series with said impedance, and means including a rotary switch in series with said source and said impedance for varying the value of said direct current at a rapid rate, said switch comprising a cylinder made of materials containing a lubricating substance and light-weight metal brushes in contact with said cylinder.

In testimony whereof, I have hereunto subscribed my name this 6th day of November, 1928.

JOSEPH W. LEGG.